H. DOWNING.
ANIMAL TRAP.
APPLICATION FILED MAY 19, 1919.

1,317,866.

Patented Oct. 7, 1919.

Inventor
Hiram Downing

By Herbert E. Smith
Attorney

UNITED STATES PATENT OFFICE.

HIRAM DOWNING, OF SPOKANE, WASHINGTON.

ANIMAL-TRAP.

1,317,866.　　　　Specification of Letters Patent.　　Patented Oct. 7, 1919.

Application filed May 19, 1919. Serial No. 298,177.

*To all whom it may concern:*

Be it known that I, HIRAM DOWNING, a citizen of the United States, residing at Spokane, in the county of Spokane and State of Washington, have invented certain new and useful Improvements in Animal-Traps, of which the following is a specification.

The present invention relates to an improved animal trap for rats, mice, and other rodents, and is of the self and ever set type of such devices.

The primary object of the invention is the provision of a trap of this character that is reliable and sure in operation, comparatively simple in construction and inexpensive in cost, durable, and withal a comparatively perfect mechanism for accomplishing its purposes.

The invention consists essentially in a trap as described utilizing a tiltable platform in connection with a supporting box or trap, and specially constructed approaches to the trap which co-act with the tiltable platform to hold it inoperative until the proper instant and then to release the platform to plunge the unsuspecting rodent into the trap, all as will be hereinafter more fully described and claimed.

In the accompanying drawings one complete example of the physical embodiment of the invention is illustrated, the parts being combined and arranged according to the best mode so far devised for the practical application of the principles of my invention.

Figure 1:
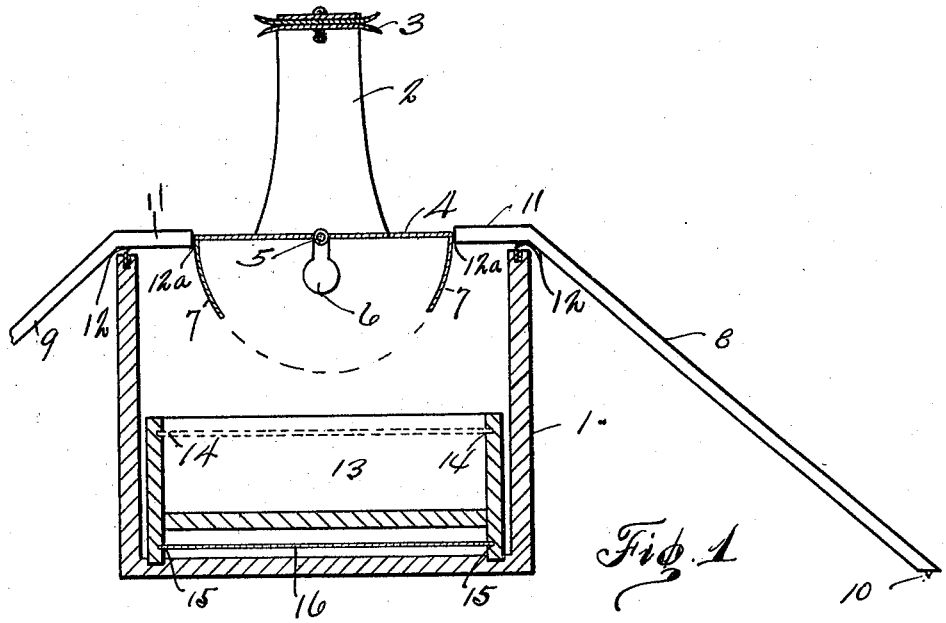
Figure 1 is a transverse sectional view through the box or trap, showing the approaches in full elevation.
Figure 2:
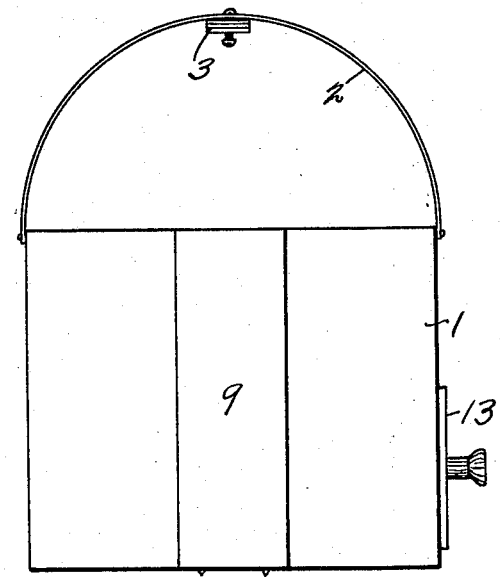
Fig. 2 is an end view of the trap.
Figure 3:
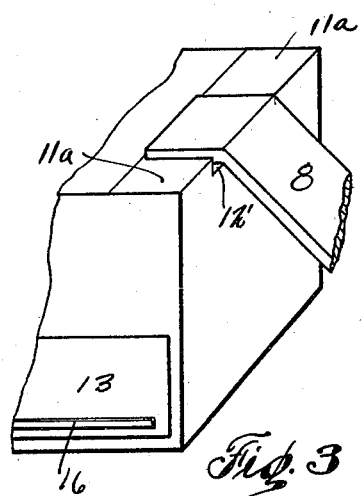
Fig. 3 is a perspective view of a fragment of the trap showing the relation thereto of the inclined approaches.

In the preferred form of the invention illustrated in the drawing the box or trap 1 is of proper shape and dimensions and practically open at the top, except as will be hereinafter stated, and this box is provided at a central point with the transversely arranged arch or hoop 2 secured at the sides thereof, and the bail has spring fingers 3 in which the bait may be clamped.

Extending longitudinally of the box or trap is a metallic platform 4 that is tiltable and is supported in the sides of the box on the rock bar 5 forming a pivot or fulcrum point for the platform, and a counterbalance 6 is carried under the platform to hold it level as is well understood.

Extending along the sides of the tiltable platform are a pair of curved flanges 7—7 on the arc of a circle with the pivot rod as a center, which act as guards for the prevention of escape of the trapped rodent.

The approach to this tiltable platform, for the rodent, is by way of oppositely disposed inclined ways or boards 8 and 9, which are duplex in character, and each is provided with a bottom spur 10 to hold it against displacement, and the upper ends of these inclined ways are formed as horizontally disposed platform strips 11, flush with the top surface of the side strips 11$^a$ of the trap and elevated above the side walls of the trap by spring pins 12 extending beneath these platform strips 11. Preferably the upper edge of the side wall of the trap is notched as at 12' in order that the upper end of the inclined approach may, normally, lie flush with the top boards 11$^a$ and yet be elevated above the side walls of the box.

At 12$^a$ it will be seen that the horizontal platform strip 11 is in frictional contact with the tiltable platform, and when a rodent approaches the bait, as long as his weight is on the inclined, spring supported approach, the latter is depressed, with the spur 10 as a pivot, and the friction at point 12$^a$ is sufficient to hold the platform against tilting. However, when the rodent, lured by the bait, unsuspectingly steps off the inclined approach, the tiltable platform is freed from frictional contact therewith, with the result that the rodent or animal overcomes the equilibrium of the tiltable platform and is plunged into a removable drawer or receptacle 13 in the interior of the box trap.

This drawer has an upper pair of grooves 14 and a lower complementary pair 15 for the slide cover 16, and it will be seen that when set for a rodent, the slide cover is out of the way under the bottom of the drawer, but when a rodent is caught the slide cover may be withdrawn through the slot 17 from its lower position, and shoved through an upper slot 18 into the grooves 14 of the drawer to form a cover for the drawer to prevent escape of the trapped rodent.

The parts of the device are so proportioned that the bait is held sufficiently distant from the platform that it cannot be reached until and unless the rodent walks on the tiltable platform, and then of course he is plunged to his destination before he can reach the bait, thus saving the bait. However the bait must be placed within the proper distance to tempt the rodent, so that he will unsuspectingly step off the platform onto the tiltable platform.

What I claim is—

1. The combination with the box trap having a tiltable platform and bait support thereabove, of a depressible approach held normally elevated and engaging said platform to prevent tilting while the animal is on the approach and to allow of tilting when the rodent steps from the approach to the platform.

2. The combination with the box trap having a tiltable platform and bait support thereabove, of an inclined depressible approach held normally elevated and engaging the platform to prevent tilting while the animal is on the approach and to allow of tilting thereof when the rodent steps from the approach to the platform, said box being notched to receive the approach and a spring beneath the approach to hold it elevated, as described.

3. The combination with the box trap and removable drawer therein and said trap having a tiltable platform and a bait support thereabove, of an inclined approach having a spur resting on a suitable support to act as a pivot when the approach is depressed, said approach having an upper level end portion flush with the top of the tiltable platform and top of the box and the side walls of the box notched to receive this end, and elevating springs between the level end of the approach and box wall, said level end engaging the tiltable platform to prevent tilting while the animal is on the approach and to allow of tilting thereof when the rodent steps from the approach to the tiltable platform.

In testimony whereof I affix my signature.

HIRAM DOWNING.

Copies of this patent may be obtained for five cents each, by addressing the "Commissioner of Patents, Washington, D. C."